Nov. 18, 1941.   E. M. LIEBERMAN   2,263,095
CENTRIFUGAL SEPARATOR AND PUMP
Filed Nov. 24, 1939
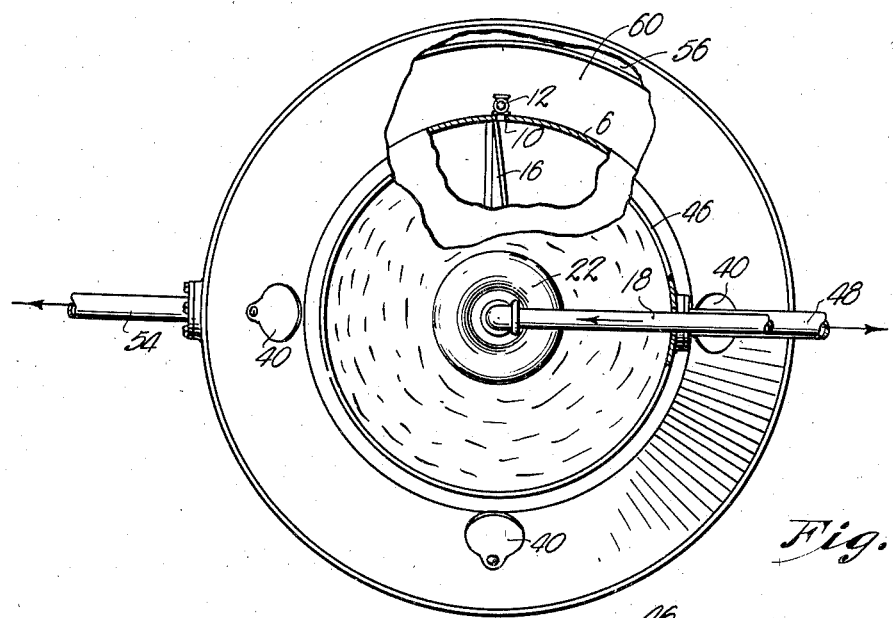
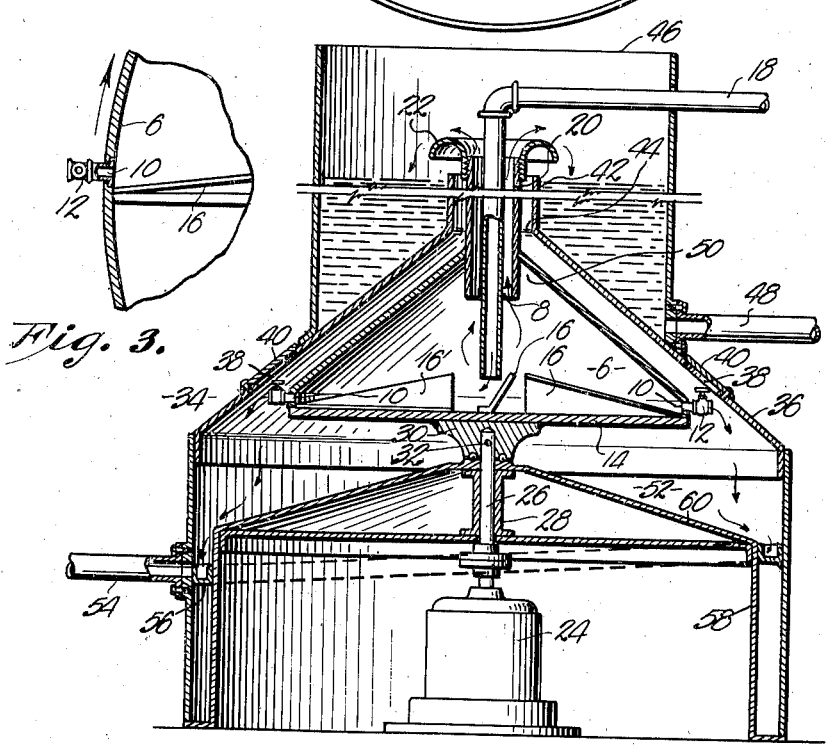
INVENTOR.
Edgar M. Lieberman
BY
ATTORNEYS Patented Nov. 18, 1941

2,263,095

UNITED STATES PATENT OFFICE 2,263,095

CENTRIFUGAL SEPARATOR AND PUMP

Edgar M. Lieberman, Merriam, Kans., assignor to Eric W. Bacharach, Kansas City, Mo.

Application November 24, 1939, Serial No. 305,957

8 Claims. (Cl. 233—27)

This invention relates to liquid handling equipment and particularly, a centrifugal separator and pump that may be used for removing foreign matter from raw liquids and conveying the clarified liquid to a receiving tank from which the same may be forced without the use of means other than that included in the apparatus embodying this invention.

One of the important aims of the present invention is to provide a centrifugal separator and pump wherein is included unique means for collecting sludge as it is thrown from a revolving vessel; a novel means for receiving clarified liquid from said revolving vessel as rotation is imparted thereto; and specially disposed parts that will permit collecting a quantity of clarified liquid to produce the necessary head whereby a liquid may be conveyed to suitable points after treatment.

A yet further object of this invention is the provision of strong, durable, simple and inexpensive means for embodying the concepts of this invention, which means may be of any selected type that has particular utility in the handling and treatment of water.

Minor objects of the invention will become apparent during the course of the following specification that refers to the physical embodiment, illustrated in the accompanying drawing wherein:

Figure 1 is a top plan view of a centrifugal separator and pump made in accordance with the present invention.

Figure 2 is a vertical, condensed central sectional view through the same; and,

Figure 3 is a fragmentary sectional view of a portion of the vessel taken through one of the outlet openings and its valve.

Heretofore, it has been difficult to realize advantages from centrifugal separators for liquid in the nature of qualities permitting the separator to be useful as a pump or the like. It is desirable to combine in apparatus of the character contemplated by this invention, means for disposing a volume of liquid where the head will be effective in forcing the same through selected pipes or tubes to a point remote from the separator, and it will be apparent to one skilled in the art that the manner of forming the parts of the device about to be described, is conducive to realizing the advantages where a pumping function occurs concurrently with a separating action.

The preferred form of the invention, illustrated herewith, comprises a frusto-conical vessel 6 having an outlet port 8 through the upwardly and inwardly inclined wall on the axis of rotation thereof. A series of peripheral outlet openings 10 controlled by valves 12 are formed through the annular wall of vessel 6 immediately above the bottom 14 thereof.

Radial vanes 16 mounted on the inner face of bottom 14 of vessel 6 are inclined in the direction of rotation of the vessel, and the width of these vanes progressively decreases as the outermost ends are approached. The inner ends of vanes 16 are spaced from the center of bottom wall 14 and thereby leave a space into which projects a portion of suction pipe 18 that extends from a source of supply of the raw liquid to be treated.

An extension 20 projects above and below the edge of vessel 6 forming outlet port 8 on the axis thereof, and the upper end of this extension is provided with an annular lip 22 which is of the form shown in Fig. 2.

Motor 24 drives shaft 26 that is journalled in bearing 28, and it is to this shaft 26 that vessel 6 is attached through the medium of a block or similar fixture 30. Suitable means, such as a pin 32 or the like, may be employed to maintain vessel 6 and shaft 26 in coupled relation.

A housing, indicated generally by the numeral 34, has a conical upper wall 36, the angle of inclination of which is similar to the angularity of frusto-conical vessel 6. Openings 38 provided with removable covers 40 through this wall, allow access to valves 12 through which pass the collected sludge during the operation of the apparatus.

An upwardly extending neck 42 circumscribes the outlet throat 44 on housing 34, and this neck 42 underlies annular deflector 22 so that clarified liquid passing outwardly through extension 20, will not pass into housing 34 to be mixed with sludge therein.

A stand pipe 46 bottomed by the conical wall 36 of housing 34, extends upwardly for a considerable distance so that an appreciable volume of clarified liquid may be collected in stand pipe 46 to produce the head which forces the liquid through outlet tube 48. This tube 48 joins stand pipe 46 at a point considerably below the upper end of neck 42 and deflector 22 so that the level of clarified liquid in stand pipe 46 may be maintained below these parts without effecting the force employed in directing the clarified liquid through tube 48 to a remote point.

An annular pocket 50 formed between the inwardly projected portion of extension 20 and the inclined wall of vessel 6, insures that matter foreign to the liquid will not pass upwardly in the direction of the arrows shown in Fig. 2, to a point where it will be discharged into stand pipe 46.

Housing 34 is specially created in that it carries motor 24 and provides a sludge collecting basin 52, the bottom of which is inclined toward outlet duct 54. The lower portion of housing 34 is double walled and trough 56 circumscribes the inner wall 58 which is closed by a substantially dome-shaped top portion 60.

During the operation of the separator and pump, raw liquid is introduced through suction pipe 18 and freed in the low pressure zone on the axis of vessel 6 between the inner ends of vanes 16. Pipe 18 may be extended to terminate in the high pressure zone of vessel 6 if desired. Vessel 6 is rotated at a high rate of speed and entrained matter in the raw liquid is directed outwardly toward the peripheral ports 10, the passage of sludge through each of which is controlled by a valve 12. The sludge and foreign matter is forced into sludge collector 52 through valves 12 and thence flows by gravity through duct 54. Sufficient liquid is added to the sludge to insure its flow.

Clarified liquid follows the inner surface of upwardly and inwardly inclined wall of vessel 6 and thence is forced out through extension 20 by means of centrifugal force imparted to it by the vessel, and into stand pipe 46 from whence it may be withdrawn through tube 48. Solids removed by the centrifugal action are forced downwardly and outwardly along the inclined wall of vessel 6 so that they escape through valves 12.

Since $V^2/2G=$ the head obtained in a centrifugal pump in which V is the average velocity of the fluid at its outlet and G is the acceleration of gravity, it is apparent that the device above described, functions as a centrifugal pump. The fluid inside extension 20 and around suction pipe 18 has a velocity caused by the rotary motion of vessel 6 which is capable of moving the liquid upwardly to a height indicated by $V^2/2G$.

The preferred embodiment of the invention has been illustrated and described, and because it is possible to build centrifugal separators and pumps having physical characteristics other than those shown, it is desired to be limited only by the spirit of the invention and scope of the appended claims.

Having thus described the invention, what is claimed as new and desired to be secured by Letters Patent is:

1. In a device of the character described, a centrifugal separator and pump comprising a cone-shaped vessel provided with an axial outlet port at its apex and peripheral outlet openings; means for rotating the vessel about its axis whereby to discharge solids from the vessel through said openings and to pump liquid through the outlet port; a housing for the vessel having a sludge outlet duct in communication therewith; a raw liquid inlet pipe projecting into the vessel and terminating on the axis of rotation thereof; and a stand pipe for clarified liquid mounted on the housing in communication with the vessel, said stand pipe having an outlet below the liquid level maintained by the vessel, said vessel having a plurality of vanes radially disposed across the inner face of the bottom of the vessel and inclined in the direction of travel of the vessel.

2. In a device of the character described, a centrifugal separator and pump comprising a cone-shaped vessel provided with an axial outlet port at its apex and peripheral outlet openings; means for rotating the vessel about its axis whereby to discharge solids from the vessel through said openings and to pump liquid through the outlet port; a housing for the vessel having a sludge outlet duct in communication therewith; a raw liquid inlet pipe projecting into the vessel and terminating on the axis of rotation thereof; and a stand pipe for clarified liquid mounted on the housing in communication with the vessel, said stand pipe having an outlet below the liquid level maintained by the vessel, said vessel having a plurality of radial vanes inclined in the direction of travel of the former and extending outwardly from the axis of rotation thereof across the inner face of the bottom of the vessel, said vanes progressively decreasing in height as the outer ends are approached.

3. In a continuous liquid treating apparatus, means for separating relatively heavy matter from the liquid being treated and simultaneously pumping the lighter separated liquid to a point of use comprising a cone-shaped vessel provided with an outlet port at its apex and peripheral outlet openings at the line of juncture between the base and inclined wall of the vessel; a housing for the vessel having an outlet duct in communication therewith; a tubular, vertical extension extending upwardly from the vessel at the outlet port thereof; an upwardly extending neck circumscribing the extension, spaced therefrom, and coextensive therewith; a pipe for the liquid being treated extending downwardly through the said extension to a point near the bottom of the vessel; means for receiving the lighter separated liquid from the upper end of the extension; and means for rotating the vessel.

4. In a continuous liquid treating apparatus, means for separating relatively heavy matter from the liquid being treated and simultaneously pumping the lighter separated liquid to a point of use comprising a cone-shaped vessel provided with an outlet port at its apex and peripheral outlet openings at the line of juncture between the base and inclined wall of the vessel; a housing for the vessel having an outlet duct in communication therewith; a tubular, vertical extension extending upwardly from the vessel at the outlet port thereof; an upwardly extending neck circumscribing the extension, spaced therefrom, and coextensive therewith; a pipe for the liquid being treated extending downwardly through the said extension to a point near the bottom of the vessel; means for receiving the lighter separated liquid from the upper end of the extension; and means for rotating the vessel, said extension having a deflector on the upper end thereof formed to overhang the upwardly extending neck of the housing and direct the lighter separated liquid into the receiving means.

5. In a device of the character described, a centrifugal separator and pump comprising a cone-shaped vessel provided with an axial outlet port at its apex and peripheral outlet openings; means for rotating the vessel about its axis whereby to discharge solids from the vessel through said openings and to pump liquid through the outlet port; a housing for the vessel having a sludge outlet duct in communication therewith; a raw liquid inlet pipe projecting into the vessel and terminating on the axis of rotation thereof; and a stand pipe for clarified liquid mounted on the housing in communication with the vessel, said stand pipe having an outlet below the liquid level maintained by the vessel, said vessel having a plurality of radial vanes across the inner face of the bottom of the vessel, said vanes progressively decreasing in height as the outer ends are approached.

6. In a device of the character described, a centrifugal separator and pump comprising a cone-shaped vessel provided with an axial outlet port at its apex and peripheral outlet openings; means for rotating the vessel about its axis whereby to discharge solids from the vessel through said openings and to pump liquid through the outlet port; a housing for the vessel having a sludge outlet duct in communication therewith; a raw liquid inlet pipe projecting into the vessel and terminating on the axis of rotation thereof; said vessel having a plurality of vanes radially disposed across the inner face of the bottom of the vessel and inclined in the direction of travel of the vessel.

7. In a device of the character described, a centrifugal separator and pump comprising a cone-shaped vessel provided with an axial outlet port at its apex and peripheral outlet openings; means for rotating the vessel about its axis whereby to discharge solids from the vessel through said openings and to pump liquid through the outlet port; a housing for the vessel having a sludge outlet duct in communication therewith; a raw liquid inlet pipe projecting into the vessel and terminating on the axis of rotation thereof; said vessel having a plurality of vanes radially disposed across the inner face of the bottom of the vessel, said vanes progressively decreasing in height as the outer ends are approached.

8. In a device of the character described, a centrifugal separator and pump comprising a cone-shaped vessel provided with an axial outlet port at its apex and peripheral outlet openings; means for rotating the vessel about its axis whereby to discharge solids from the vessel through said openings and to pump liquid through the outlet port; a housing for the vessel having a sludge outlet duct in communication therewith; a raw liquid inlet pipe projecting into the vessel and terminating on the axis of rotation thereof; said vessel having a plurality of vanes radially disposed across the inner face of the bottom of the vessel and inclined in the direction of travel of the vessel, said vanes progressively decreasing in height as the outer ends are approached.

EDGAR M. LIEBERMAN.